(12) United States Patent
Bibas

(10) Patent No.: US 10,473,915 B2
(45) Date of Patent: Nov. 12, 2019

(54) BEAM MANIPULATION SYSTEM

(71) Applicant: Charles Bibas, Great Neck, NY (US)

(72) Inventor: Charles Bibas, Great Neck, NY (US)

(*) Notice: Subject to any disclaimer, the term of this patent is extended or adjusted under 35 U.S.C. 154(b) by 143 days.

(21) Appl. No.: 15/715,073

(22) Filed: Sep. 25, 2017

(65) Prior Publication Data

US 2018/0088318 A1    Mar. 29, 2018

Related U.S. Application Data

(60) Provisional application No. 62/399,791, filed on Sep. 26, 2016.

(51) Int. Cl.
| | | |
|---|---|---|
| *G02B 26/08* | (2006.01) | |
| *G02B 26/10* | (2006.01) | |
| *G02B 26/12* | (2006.01) | |
| *B33Y 10/00* | (2015.01) | |
| *B33Y 30/00* | (2015.01) | |

(52) U.S. Cl.
CPC .......... *G02B 26/0816* (2013.01); *B33Y 10/00* (2014.12); *B33Y 30/00* (2014.12); *G02B 26/105* (2013.01)

(58) Field of Classification Search
CPC ............ G02B 26/0841; G02B 26/0816; G02B 26/0833; G02B 26/105; G02B 26/101; G02B 26/3518; G02B 26/356; G02B 7/182
USPC ........................................................ 359/225.1
See application file for complete search history.

(56) References Cited

U.S. PATENT DOCUMENTS

| | | | | |
|---|---|---|---|---|
| 2008/0023455 | A1* | 1/2008 | Idaka | B23K 26/082 219/121.73 |
| 2010/0067076 | A1* | 3/2010 | Brotherton-Ratcliffe | G03H 1/202 359/12 |
| 2014/0265034 | A1* | 9/2014 | Dudley | B33Y 10/00 264/401 |

* cited by examiner

*Primary Examiner* — William R Alexander
*Assistant Examiner* — Tamara Y. Washington

(57) ABSTRACT

A beam director, typically comprises a first mirror rotating about a longitudinal axis, with a reflective surface at an acute angle to the longitudinal axis, which enables a laser beam to be transmitted along the longitudinal axis and redirected onto a work surface, which is typically perpendicular to the longitudinal axis. A second stationary arcuate mirror segment may be used to reflect the beam along an arcuate path on the work surface. Previous beam director systems can be improved or simplified by: 1) elimination of the second mirror with a 90° reflection to the work surface; 2) fixing the Tangent factor when drawing/rendering/sintering/cutting using f-theta like lens; and 3) fixing the Tangent factor by controlling the amount and/or the duration of energy.

18 Claims, 8 Drawing Sheets

BEAM MANIPULATION SYSTEM

RELATED APPLICATIONS

The present application claims priority from U.S. Patent Application 62/399,691 filed Sep. 26, 2016, which is incorporated herein by reference.

TECHNICAL FIELD

The present invention relates to a beam director for a 3D printer, and in particular to a beam director including a rotating reflector rotating around a horizontal axis and receiving a beam of light along a horizontal axis.

BACKGROUND

Conventional 3D printers, such as the one disclosed in U.S. Pat. No. 9,435,998 issued Sep. 6, 2016 to Bibas et al, which is incorporated herein by reference, include beam directors with reflectors, which rotate about and receive light along a vertical axis. Accordingly, a second reflector is typically required redirect the beam onto the work surface.

SUMMARY

The present invention relates to a beam director comprising:
a light source for generating a beam of light;
a reflector configured to receive the beam of light from the light source along a rotational axis of the reflector for reflecting the beam onto a work surface at a constant angle to the rotational axis; and
an actuator for rotating the reflector about the rotational axis;
wherein the rotational axis is parallel to the work surface; and
whereby the reflector is capable of receiving the beam of light along the rotational axis, and reflecting the beam of light onto the work surface at a plurality of different angular positions of the reflector following a path relative to the work surface and tracing out a line perpendicular to the rotational axis on the work surface.

DETAILED DESCRIPTION

Figure 1:
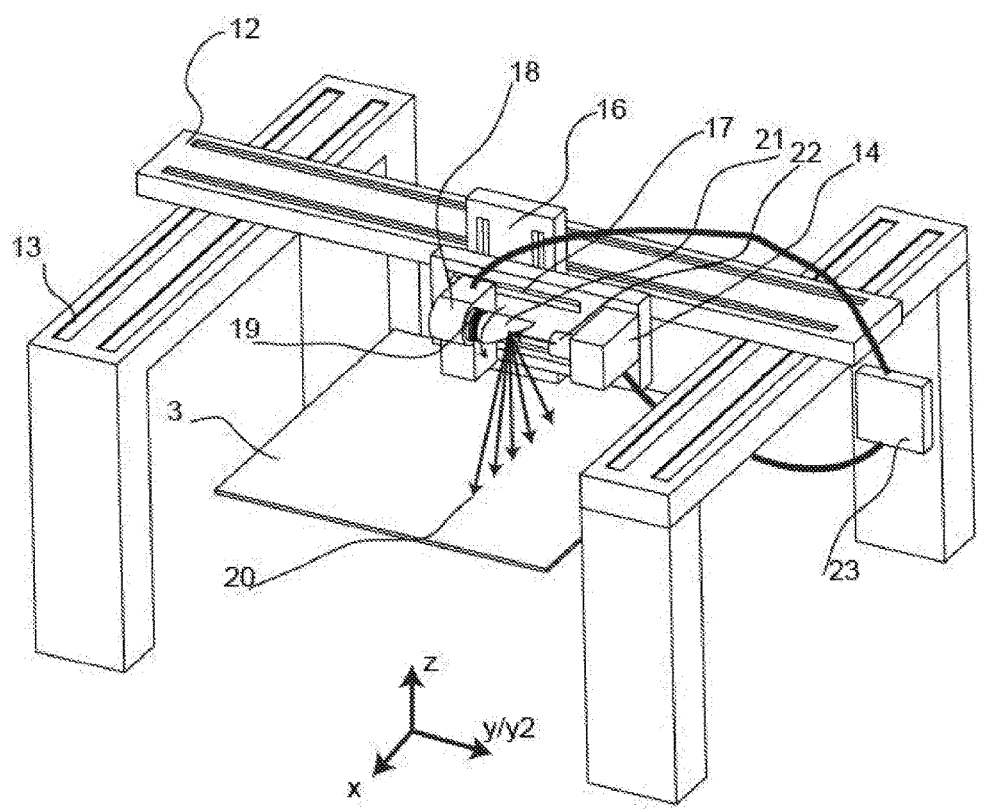
FIG. 1 illustrates an isometric view of a print head for a 3-D printer in accordance with an embodiment of the present invention.

The beam director 19 includes a reflector, e.g. mirror 21, rotatable about a horizontal, longitudinal rotational axis, e.g. which is parallel to a work surface 3, by an actuator 18, e.g. a motor. The mirror 21 includes a reflective surface disposed at an acute angle, e.g. 30° to 60°, preferably 45°, to the longitudinal axis for directing a beam of light 20 launched from a light source 14, e.g, laser, along a horizontal axis, e.g. parallel to the Y-axis and the work surface 3.

The beam director 19 of the present invention may be utilized as a print head for a 3-D printer (FIG. 1) and installed on a positioning system of a 3-D printer, which may take the form of a X-Y-Z gantry system. A Y-axis stage 13 may be comprised of two elevated tracks, one on each side of a work surface 3, each track supported by one or more pillars. A first X-axis stage 12 extends between the two elevated tracks of the Y-axis stage 13, includes an elevated track, and is reciprocateable along the X axis in the elevated tracks of the Y-axis stage 13. A Z axis stage 16 is reciprocateable along the Y-axis in the track of the X-axis stage 12, and includes a vertical track enabling the beam director 19 to move in the Z-axis, towards and away from the work surface 3. The beam director 19 is mounted on a base, which is reciprocateable in the tracks of the Z-axis stage 16. The base also includes tracks in which the beam director 19 is mounted for reciprocal motion in the Y2 direction for moving the mirror 21 closer or farther away from the light source 14

When the beam is activated, e.g. launched along the rotational axis parallel to the work surface 3, and the actuator 18 rotates the reflector 21, the beam strikes the reflector 21 reflecting the beam, e.g. substantially perpendicular to the rotational axis, to the work surface 3; the beam then follows a path relative to the work surface, e.g. substantially perpendicular to the rotational axis, e.g. parallel to the X-axis, and traces out a line perpendicular to the rotational axis, on the work surface 3 including a plurality of spots at desired positions on the work surface 3 corresponding to angular positions of the reflector 21. When reflector 21 is an off axis parabolic mirror it will further simplify the optics system as parabolic reflector will not only used as a reflector but also as a focus element. Where a beam entering along the optical axis will exit and focus at the work area.

The laser 14 is centered along the longitudinal axis of the rotating mirror 21. The base, moving along the Y2 axis, is used by the rotating mirror 19 to move the mirror 21 closer to the laser 14 to change the focus, if needed (more below when focusing on the edge of the model and not the center of the model)

Figure 2:
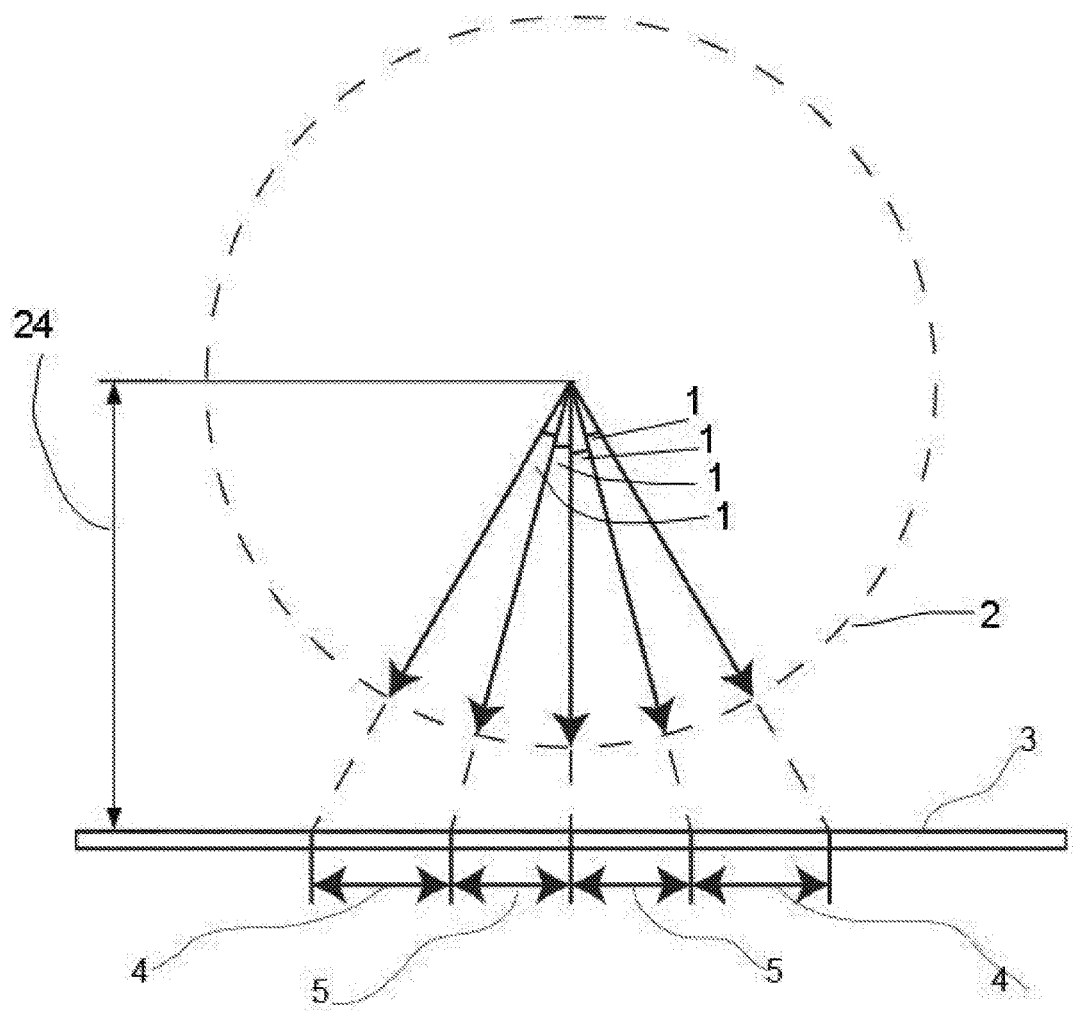
FIG. 2 illustrates rays of light directed by the printhead of FIG. 1, showing a tangent factor in which the distances between rays of light increase at the work surface although the beam rotates in constant movement as reflected by same angles.
Figure 3:
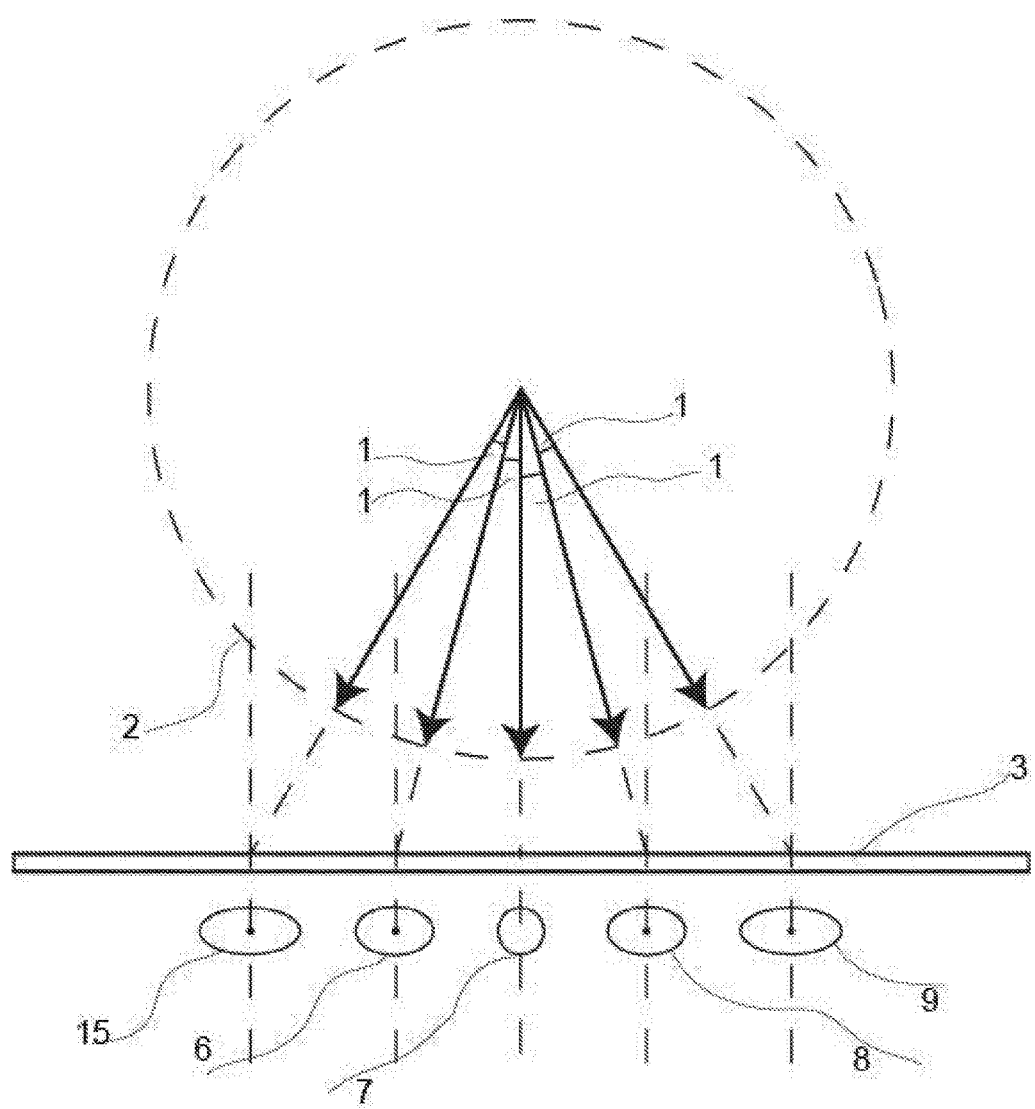
FIG. 3 illustrates rays of light directed by the printhead of FIG. 1, showing a tangent factor in which the shape of the spots of light change at the work surface as the beam rotates in constant movement as reflected by same angles.

A drawback of the current arrangement is the Tangent factor illustrated in FIGS. 2 and 3. The tangent factor results in the distance between the rays of light increasing at the work surface 3 even though the beam rotates at a constant rotational velocity, and is thereby reflected at a same angle 1 for each constant time period. Accordingly, distance 4 is larger than distance 5 as:

$$H^*\tan(2^*\alpha) - H^*\tan(\alpha) > H^*\text{Tan}(\alpha)$$

Where H 24 is the normal to the work area 3 and α is 1. The further away we get from the center, i.e. shortest or normal distance, the larger the gap 4 or 5 between the points on the work area 3 for a given angular rotation of the mirror 21.

Moreover, as the beam moves away from the center:
1. Beam energy amount absorbed by the work surface is proportional to $E_0*Cos(i*\alpha)$ where $E_0$ max beam energy (or power) at $\alpha=0$ and is the beam index where it start at 0 at the work surface center.
2. The beam shape is distorted from a circle 7 to an elliptic like shape 6 (stretched at 5 the further away from the center then the closet)
3. The beam area is getting larger as it gets away from the center as the beam expands from its focus compares to when it is at the center. Therefore, energy (or power) density per cm^2 is getting smaller as i increases.

Figure 4:
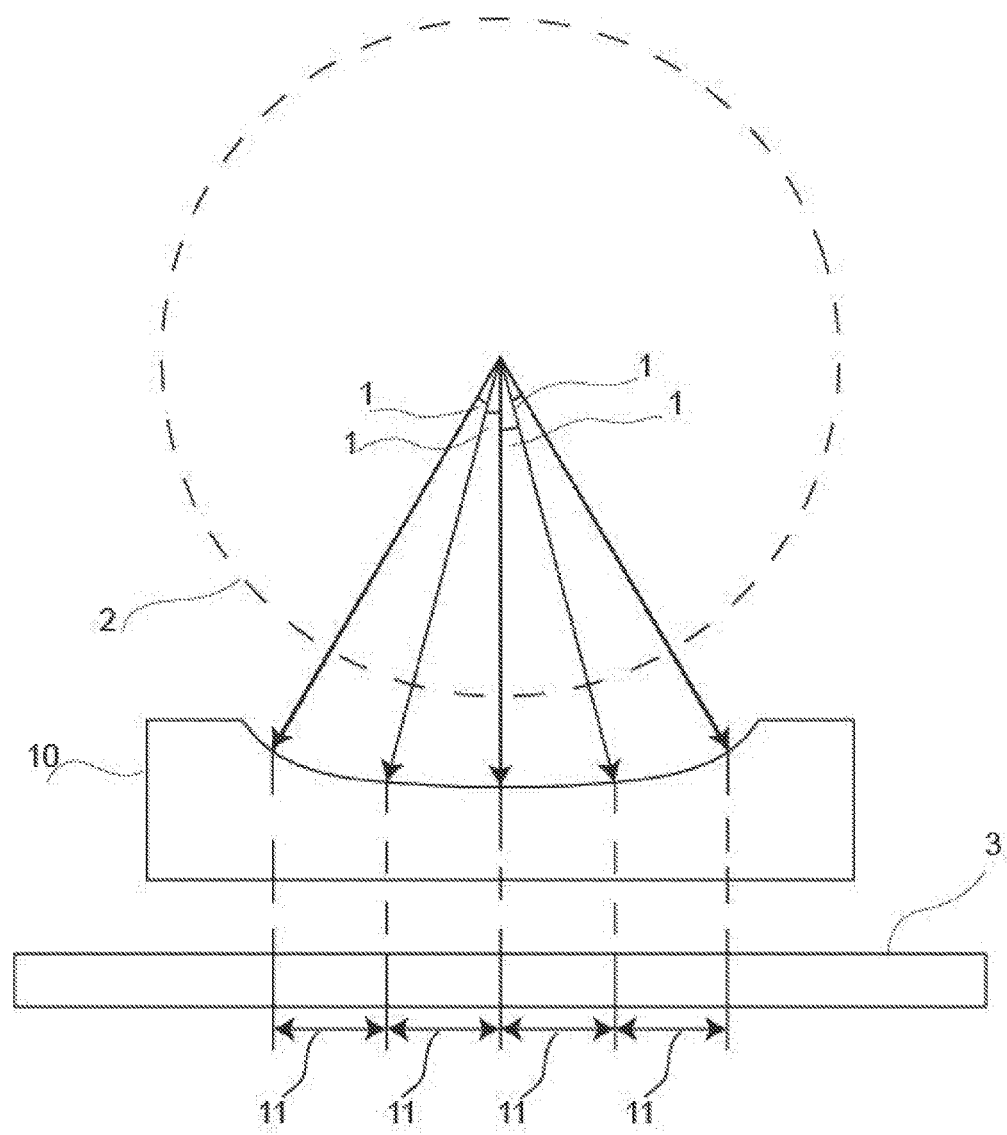
FIG. 4 illustrates a first embodiment for correcting for the tangent factor.
Figure 5:
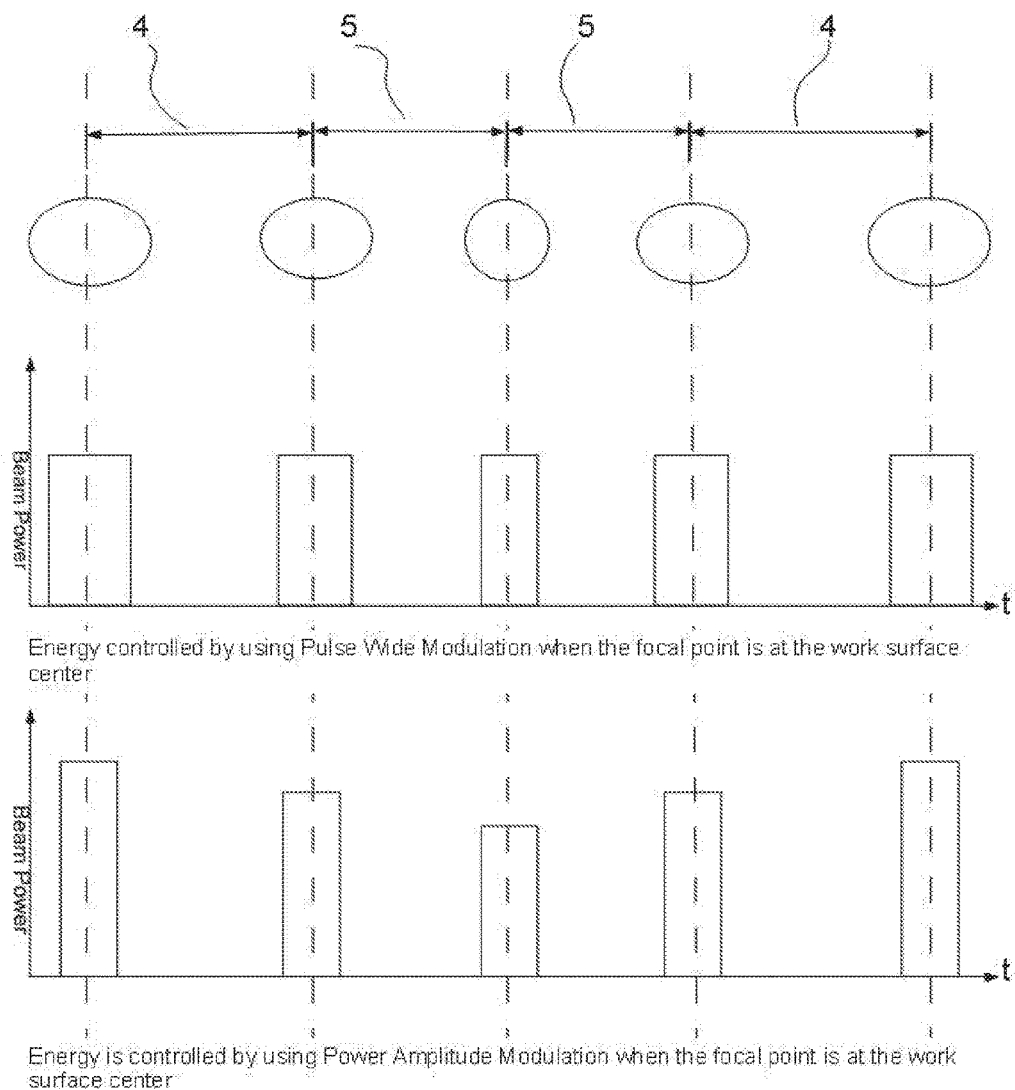
FIG. 5 illustrates a second and third embodiment for correcting for the tangent factor.
Figure 5B:
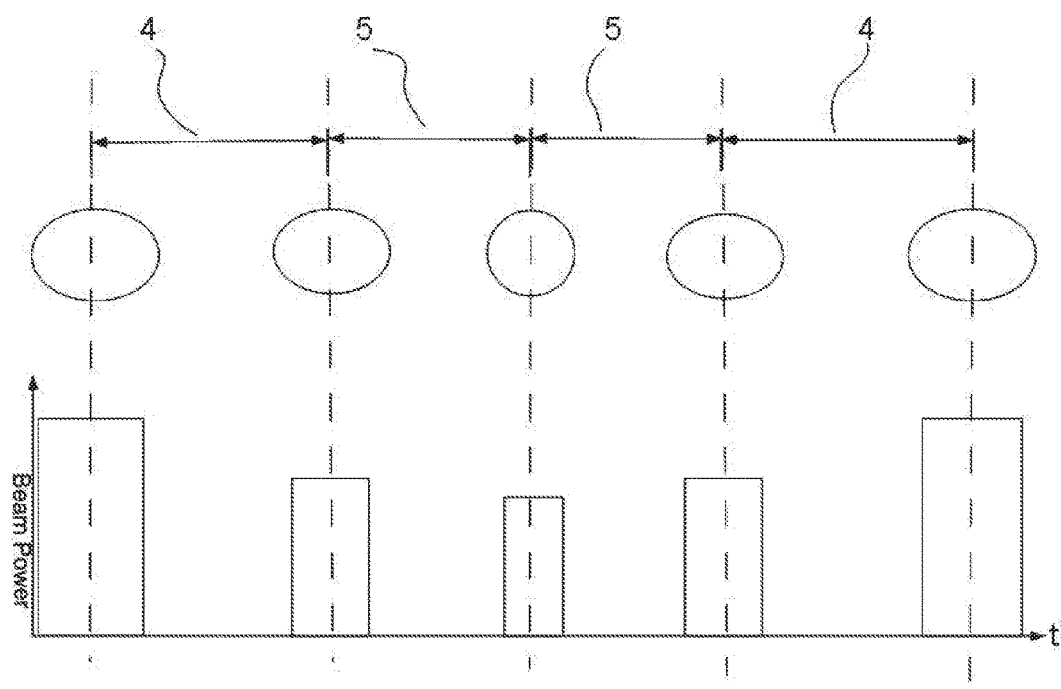
FIG. 5B illustrates a fourth embodiment for correcting for the tangent factor.

However, correction may be performed by using a correcting lens as shown in FIG. 4, such as an f-theta lens 10, ("correcting lens") where the correcting lens 10 will correct the tangent factor. This correction will produce equal distances 11 between points with equal rotational angles of the mirror 21. The correction lens 10 may be relatively expensive to make, and may not be scalable due to manufacturing limitation. As the f-theta mirror function also keeps the focus on the work surface 3 rather than on the circular path 2.

Alternatively, the tangent factor may be corrected via electronic and/or software means and methods as illustrated in FIGS. 5, 5B, 6 and 7.

Pulse Wide Modulation (PWM) Method when the beam focus is at the center of the work surface: As the beam gets further away from the center, i.e. normal distance from the working surface 3, at higher rotation angles from the normal of the mirror 21, the power pulses generated by the laser 14 will be increased by a controller 23, such as a computer including non-transitory memory for storing computer software executable thereon for controlling the laser 14, to last longer at angular positions farther from the normal distance, therefore delivering higher energy to at least partially, but preferably substantially fully, compensate for the losses due to the $E_0*Cos(i*\alpha)$ losses. See FIG. 5; Pulse Wide Modulation.

Pulse Amplitude Modulation (PAM) Method when the beam focus is at the center of the work surface: As the beam gets further away from the center the power pulses generated by the laser 14 will deliver higher energy (higher amplitude) by the controller 23, therefore delivering higher energy to at least partially, but preferably fully, compensate for the loses due to the $E_0*Cos(i*\alpha)$ loses. See FIG. 5.; Pulse Amplitude Modulation.

Method IV: is a combination of both PWM and PAM where the focus is at the center of the work surface—When the pulse width and the pulse energy are increased as the beam moves closer to the center. Therefore, the controller 23 modulates the power by adjusting both the pulse time period and the pulse energy amplitude. See FIG. 5B.

Figure 6:
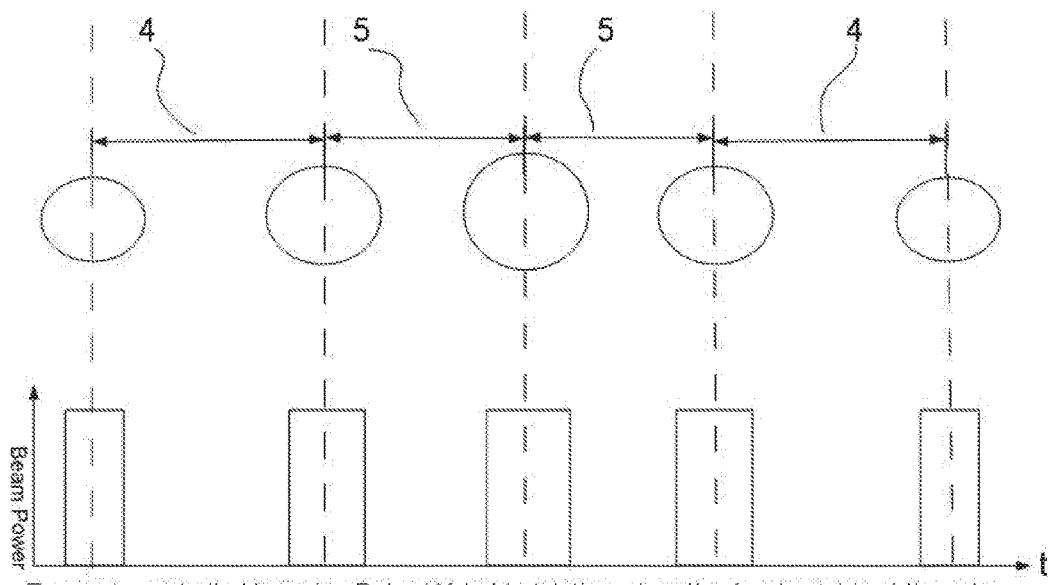
FIG. 6 illustrates a fifth and sixth embodiment for correcting for the tangent factor.
Figure 6:
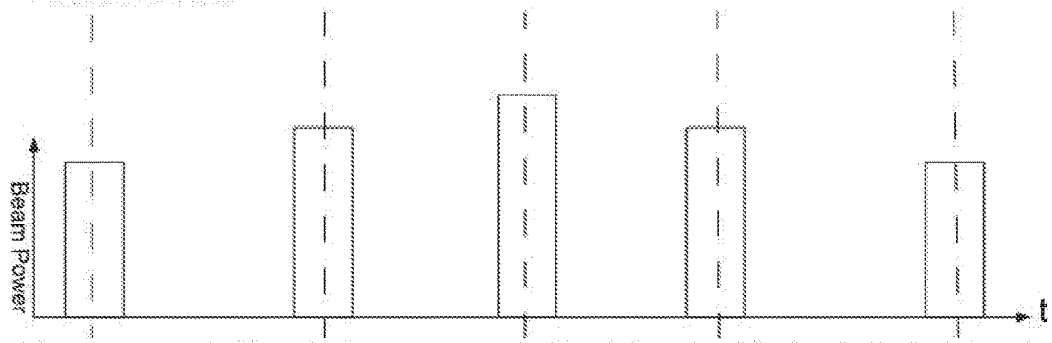
Figure 7:
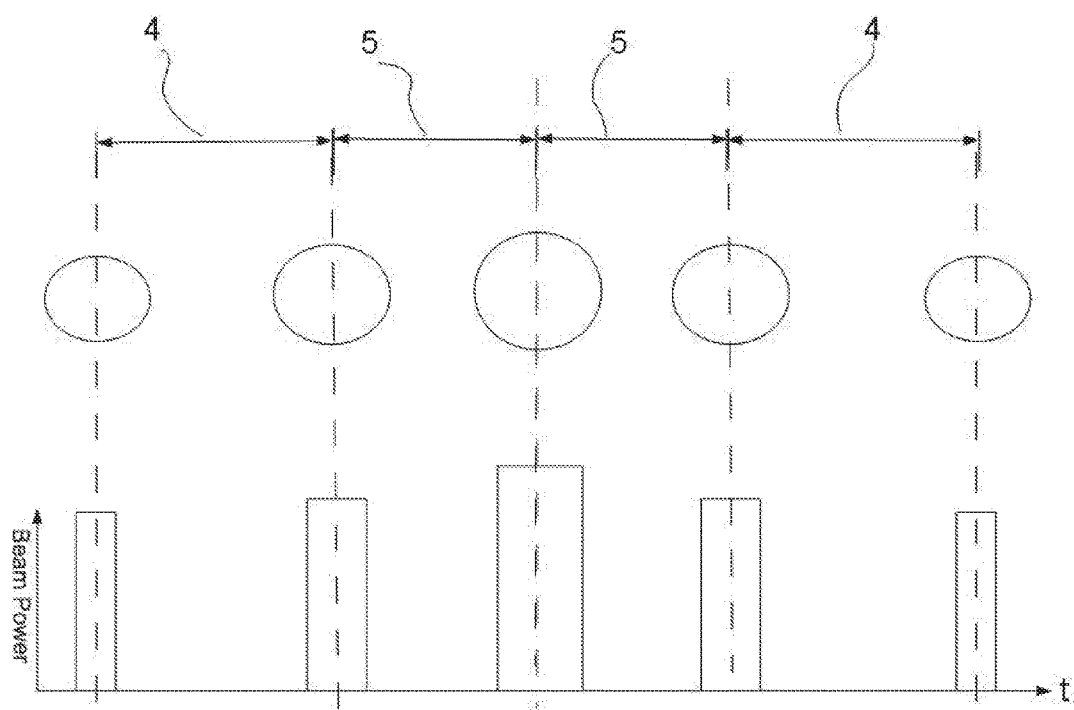
FIG. 7 illustrates a seventh embodiment for correcting for the tangent factor.

FIG. 6. Illustrates compensation using of Pulse Wide Modulation or Pulse Amplitude Modulation is utilized when the focal point is at the edge of the work surface 3. FIG. 7. Illustrates compensation when both PWM and PAM are utilized and when the focal point is at the edge of the work surface 3. When focusing at the edge the beam size will grow as the beam travels back to the center.

DRAWING REFERENCE NUMBERS

1. Angle $\alpha$, between laser lines
2. Focal point path
3. Work surface
4. Distance between two beam at work surface at the edge of the work surface; $H*tag(2\alpha)-H*tag(\alpha)$
5. Distance between two beams closer to the work surface area; $H*tag(\alpha)$
6. Laser beam shape size and shape away from the center.
7. Laser beam size and shape at the normal to the work area.
8. Laser beam size and shape at the work surface
9. Laser beam size and shape at the work area
10. F theta like correction Lens
11. Distance between beams at the work surface
12. y axis rail
13. x axis rail
14. Laser beam generator
15. Laser beam size
16. y axis rail
17. y2 rail for the changing focal point
18. Holding bracket for rotating motor
19. General reference to the beam director
20. Laser beam path at the work surface
21. Mirror and/or Parabolic mirror
22. Optics system
23. Controller
24. The distance H from the rotating laser to the work surface

The invention claimed is:

1. A beam director comprising:
a light source for generating a beam of light;
a reflector configured to receive the beam of light from the light source along a rotational
axis of the reflector for reflecting the beam onto a work surface at a constant angle to the rotational axis;
an actuator for rotating the reflector about the rotational axis;
wherein the rotational axis is substantially parallel to the work surface; and
wherein the reflector is capable of receiving the beam of light along the rotational axis, and reflecting the beam of light onto the work surface at a plurality of different angular positions of the reflector following a path relative to the work surface and tracing out a line perpendicular to the rotational axis on the work surface; and
a controller for controlling an amount of energy delivered by the light source to the work surface by increasing power to the light source in an amount equal to losses proportional to energy not absorbed by the work surface quantified by $E_0*cos(\text{angular position})$ where angular position is the angle between the beam of light and a normal to the work surface, and where $E_0$ is peak power at about the focal point of the light source.

2. The beam director according to claim 1, wherein the controller is capable of increasing an amount of time the reflector directs the beam on a desired position on the work surface, as the angular position of the reflector changes to at least partially compensate for the reduction in energy.

3. The beam director according to claim 1, wherein the controller is capable of increasing an amount of power delivered by the laser on a desired position on the work surface, as the angular position of the reflector changes to compensate for the reduction in energy.

4. The beam director according to claim 1, wherein the controller is capable of both increasing the amount of power delivered by the laser on a desired position on the work surface, and increasing an amount of time the reflector directs the beam on a desired position on the work surface, as the angular position of the reflector changes to compensate for the reduction in energy.

5. The beam director according to claim 1, wherein the reflector comprises a focussing mirror; and further comprising a first distance adjuster for adjusting a distance between the reflector and the light source.

6. The beam director according to claim 1, wherein the reflector comprises an off axis parabolic type.

7. The beam director according to claim 1, further comprising a focussing lens disposed between the reflector and the work surface for equalizing a distance between positions on the work surface for equal changes in angular position of the reflector.

8. The beam director according to claim 1, further comprising an F-theta correction lens.

9. A print head for a three dimensional printer comprising the beam director of claim 1.

10. A method of directing a beam towards a work surface with a beam director, the method comprising:
generating a beam of light with a light source;
rotating a reflector about a rotational axis with an actuator;
directing the beam from the light source towards the reflector along the rotational axis of the reflector;
reflecting the beam with the reflector at an angle to the rotational axis towards the work surface;
whereby the reflector receives the beam of light along the rotational axis, which is parallel to the work surface, and reflects the beam of light onto the work surface at a plurality of different angular positions of the reflector following a path relative to the work surface and tracing out a line perpendicular to the rotational axis on the work surface; and
controlling an amount of energy delivered by the light source to the work surface by increasing power to the light source in an amount equal to losses proportional to energy not absorbed by the work surface quantified by $E_0*\cos(\text{angular position})$, where angular position is the angle between the beam of light and a normal to the work surface, and where $E_0$ is peak power at about the focal point of the light source.

11. The method according to claim 10, wherein the controlling step comprises increasing an amount of time the reflector directs the beam on a desired position on the work surface, as the angular position of the reflector changes to compensate for the reduction in energy.

12. The method according to claim 10, wherein the controlling step comprises increasing an amount of power delivered by the laser on a desired position on the work surface, as the angular position of the reflector changes to compensate for the reduction in energy.

13. The method according to claim 10, wherein the controlling step comprises both increasing the amount of power delivered by the laser on a desired position on the work surface, and increasing an amount of time the reflector directs the beam on a desired position on the work surface, as the angular position of the reflector changes to compensate for the reduction in energy.

14. The method according to claim 10, further comprising adjusting the distance between the laser and the reflector to focus the beam of light.

15. The method according to claim 10, wherein the reflector comprises an off axis parabolic type.

16. The method according to claim 10, further comprising disposing a correcting lens disposed between the reflector and the work surface for equalizing a distance between positions on the work surface for equal changes in angular position of the reflector.

17. The method according to claim 16, wherein the correcting lens comprises an F-theta lens.

18. The method of claim 10 further includes using the beam director as a print head for a three dimensional printer.

* * * * *